Jan. 12, 1926.
N. R. KRAUSE
1,569,425
SHOCK ABSORBER
Filed Oct. 31, 1924
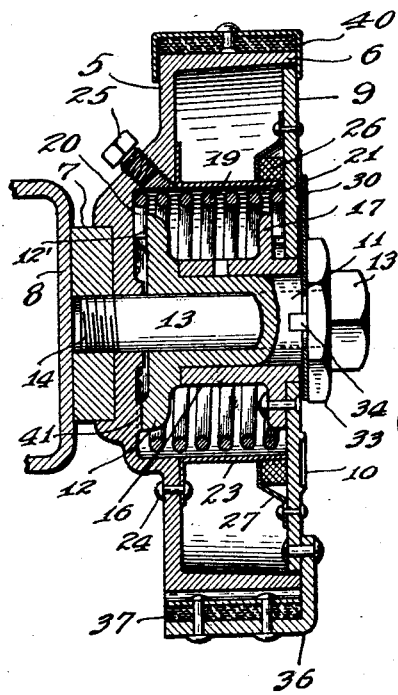
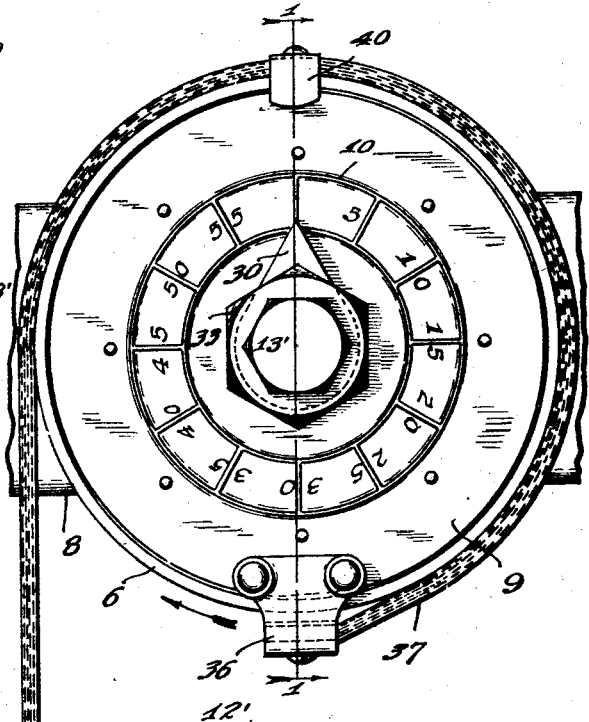
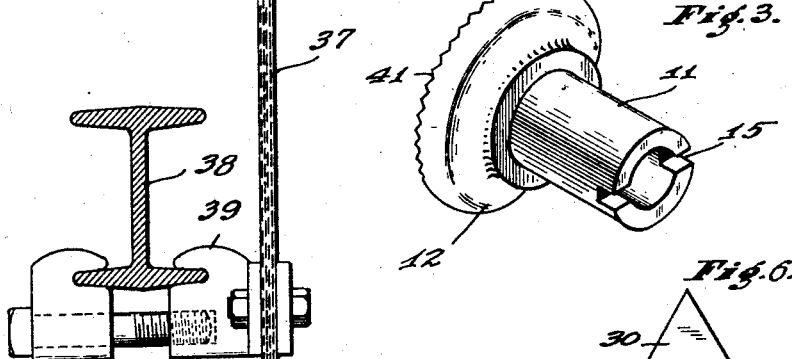
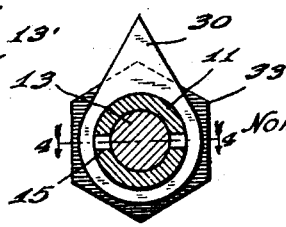
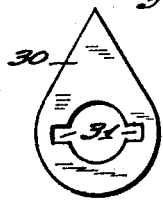
INVENTOR
NORMAN R. KRAUSE,
BY James A. Walsh
ATTORNEY Patented Jan. 12, 1926.

1,569,425

UNITED STATES PATENT OFFICE.

NORMAN R. KRAUSE, OF RACINE, WISCONSIN, ASSIGNOR OF ONE-HALF TO JAMES A. WALSH, OF INDIANAPOLIS, INDIANA.

SHOCK ABSORBER.

Application filed October 31, 1924. Serial No. 746,929.

*To all whom it may concern:*

Be it known that I, NORMAN R. KRAUSE, a citizen of the United States, residing at Racine, in the county of Racine and State of Wisconsin, have invented certain new and useful Improvements in Shock Absorbers, of which the following is a specification.

My present invention relates to improvements in shock absorbers for vehicles, the object being to provide a simple braking mechanism which will effectively check the recoil of the vehicle springs and also permit free compression movement of the same; a further object is to provide a simple and practical means for adjusting the snubber elements to suit various weights of vehicles and road conditions; and a still further object is to provide simple means whereby the snubbing or braking function of the device is greatest while the rebound of the vehicle is at its maximum and such rebound thus gradually lessened as the normal position of the vehicle spring is approached, the combination and cooperation of the devices employed acting to check the rebound smoothly and prevent sudden jolts of a vehicle when traveling over road inequalities.

In the accompanying drawings, forming part hereof, Figure 1 is a vertical sectional view of my improved device as seen when looking in the direction of the arrows 1—1 in Fig. 2; Fig. 2 a side elevation showing the same attached to the vehicle frame, the snubber being connected to an axle; Fig. 3 a perspective of a trunnion forming part of my improvement; Fig. 4 a sectional detail showing the adjusting bolt; Fig. 5 a detail elevation showing the assemblage of an indicator which I employ as seen when looking in the direction of the arrows 5—5 in Fig. 4; and Fig. 6 is an elevation of said indicator.

In said drawings the portions marked 5 indicate a casing having a flange, 6, which constitutes a brake drum fixedly and non-rotatably mounted upon a base member, 7, which in turn is secured to the vehicle frame, 8, in any appropriate manner, the opposite side of said drum being provided with a wall, 9, constituting or bearing a dial, 10, as indicated in Fig. 2. In said drum 5 I insert a trunnion, 11, having a hub, 12, thereon, and through said trunnion a bolt, 13, is inserted which is screw threaded at 14, in the base 7, the trunnion 11 being provided with recesses, 15, for a purpose to appear, and upon said trunnion I mount a collar, 16, having a flange, 17, connected to wall 9. Encircling said bolt, trunnion and collar assemblage is a coiled spring, 19, one end, 20, of which is engaged with hub 12, at 12', while the opposite end, 21, of said spring is secured to flange 17 in a similar manner. About said structure described I provide an oil retainer, 23, secured to drum 5 by a rivet, 24, or otherwise, or it may be an integral part of said drum, so that when oil is introduced through plug, 25, the mechanisms within said retainer will be lubricated, and to prevent seepage of oil I may employ a stuffing box comprising a felt washer, 26, held in position by ring, 27, secured to wall 9 in any suitable manner. The oil retainer about the spring acts as a means to confine the same snugly and concentrically and to maintain it in constant engagement and relation with its associated parts, so that once the spring is positioned within the oil retainer it is securely held from displacement; and it will also be apparent that said retainer serves the further purpose of preventing dust and extraneous matter from entering the enclosure so formed. In thus assembling my improved controlling mechanism about an adjustable bolt I am enabled by simply loosening the same to make the desired adjustment of said mechanism without disassembling or removing any of the parts, and lock the same in adjusted position by tightening said bolt. Upon trunnion 16 I secure an indicator, 30, having slots, 31, which register with the recesses 15 which trunnion and indicator are held in assembled position by a washer, 33, having lugs, 34, which project into said slots and recesses, said washer and the other elements being securely held by the bolt head, 13'.

To the lower side of drum 5 I secure a bracket or anchor, 36, to which is attached a strap or band, 37, which laps about the drum 5 as indicated in Fig. 2 and terminates adjacent an axle, 38, of the vehicle to which it is secured by any suitable device, as the clamp, 39, said strap being provided with a guard, 40, overlapping drum 5 to prevent the strap from moving off the drum and to enable it to properly track in its longitudinal movement.

In Fig. 2 my improved shock absorber is illustrated as affixed to a vehicle. When the vehicle encounters an irregular road condition in its travel the spring thereof (not shown) becomes compressed and causes the frame and axle to move closer together. When this occurs the strap 37 will become slack about the drum instantaneously with the relative change between the frame and axle as they are brought closer together, and said strap will be actuated by anchor 36 through the action of torsion spring 19 to feed over the drum in relation to the compression of the vehicle spring, and instantly the spring rebounds the strap which is in tension will exert a braking action as it creeps back around the drum, thus preventing the sudden rebound of the vehicle spring. As will be understood, when the frame and axle approach each other the arc of contact of the strap over the drum increases, and consequently the greatest snubbing or braking effect is produced at the maximum rebound effort of the vehicle spring, and gradually lessens as the normal position of the vehicle spring is approached. While said vehicle members approach each other the strap, which has a certain amount of stiffness, may leave the upper surface of the brake drum slightly so that the spring propelled anchor 36 in feeding back the strap around the drum will not be required to overcome any drag or friction of the strap upon the drum, and consequently the feed is instantaneous, rendering the snubbing highly effective while the vehicle is traveling at high speeds on uneven roads. It is desirable to leave the strap and snubbing elements exposed in order that they may be readily inspected at all times. It will be readily understood from Fig. 1 that the wall 9, flanged collar 16 and parts connected to these elements constitute a unitary structure adapted to revolve about trunnion 11 and when it is desired to increase or decrease the tension of said spring to regulate the power of said unit it is but necessary to slightly turn bolt 13, when a tool can be applied to washer 33 for turning the trunnion to the right or left, the limit of which will be governed by the indicator and dial as described, and when said bolt is tightened the trunnion and drum are thus fixedly held together in the position desired. The trunnion hub 12 and drum 5 if desired may be provided with frictional engaging surfaces, as the teeth, 41, indicated so that positive gripping of these parts is assured. It will be readily understood that a set of four devices of the character described are usually employed on a vehicle, and when installed the spring tension of the forward and rear pairs should be uniform. Therefore, in order to definitely determine the tension of each the indicator and dial may be employed, and by turning collar 16 in one device to a point registered by the indicator the adjustment of the remainder may be accordingly governed.

I claim as my invention:

1. A shock absorber comprising a drum, a shaft in said drum, a trunnion mounted on said shaft, a collar surrounding said trunnion, a coiled spring connected at one end to said trunnion and at its opposite end to said collar, and means for adjusting said trunnion to increase and decrease the tension of said spring.

2. A shock absorber comprising a drum, a shaft in said drum, a trunnion mounted on said shaft, a coiled spring connected at one end to said trunnion, means for connecting the opposite end of said spring, a wall rotatably mounted on said trunnion, a snubbing element anchored at one end to said wall and passing about said drum, and means at the opposite end of said snubber for securing the same to a vehicle.

3. In a shock absorber, a drum, a shaft passing therethrough, a trunnion mounted on said shaft, a wall enclosing one side of said drum and rotatably mounted on said trunnion, an oil retainer encircling said trunnion, means on said trunnion for permitting the adjustment thereof to regulate the tension of said spring, and means for adjusting said shaft to lock said parts together.

4. In a shock absorber, a drum, a wall enclosing one side of said drum and having a dial thereon, a brake strap connected to said wall and passing about said drum, means in said drum for regulating the tension of said strap, and an indicator adapted to register on said dial the tension of said regulating means.

5. In a shock absorber, a drum, an adjustable headed bolt therein, a trunnion on said bolt having a hub, a flanged collar on said trunnion, a coiled spring about said trunnion and collar, and a locking washer on said bolt adapted to engage said trunnion and adjust the same and to be locked therewith upon the tightening of said bolt.

6. In a shock absorber, a drum, a trunnion therein having a hub at one end and recessed at its opposite end, and a washer having means for engaging said recess by which said trunnion may be adjusted and locked.

7. In a shock absorber, a drum, a brake strap passing thereabout, a guard on said strap to prevent displacement thereof, and means in said drum for regulating the tension of said strap.

8. In a shock absorber, a drum, a brake strap passing thereabout, means for securing said strap to a vehicle, means for adjusting the tension of said strap, and means for indicating the tension produced by said adjusting means.

In testimony whereof I affix my signature.

NORMAN R. KRAUSE.